Figure 1:
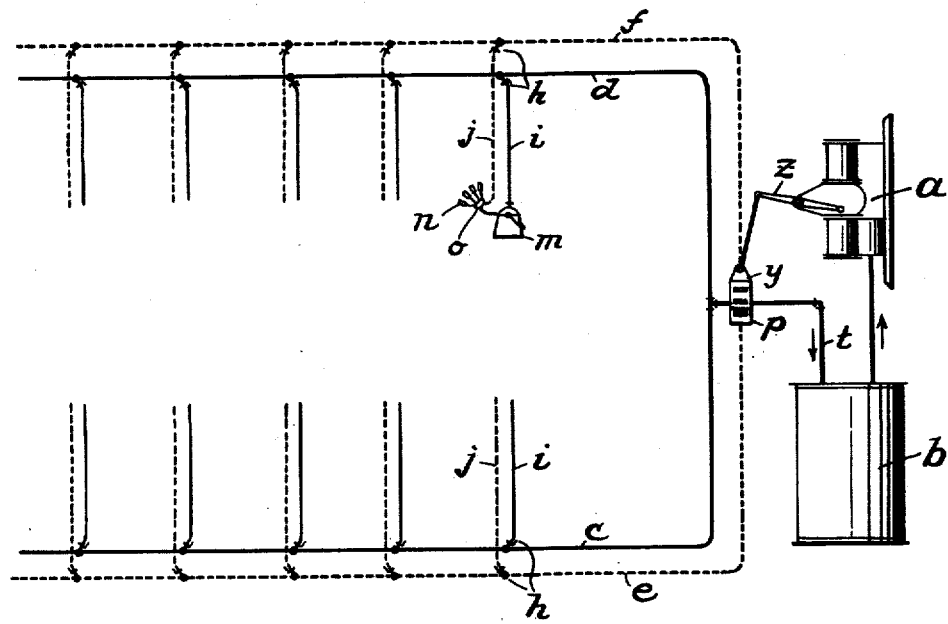

N. J. DAYSH.
MILKING MACHINERY.
APPLICATION FILED OCT. 29, 1918.

1,352,726.

Patented Sept. 14, 1920.
2 SHEETS—SHEET 2.

WITNESS:

INVENTOR
Norman J. Daysh
BY
Frank S. Busser
ATTORNEY.

UNITED STATES PATENT OFFICE.

NORMAN JOHN DAYSH, OF POUGHKEEPSIE, NEW YORK, ASSIGNOR TO THE DE LAVAL SEPARATOR COMPANY, A CORPORATION OF NEW JERSEY.

MILKING MACHINERY.

1,352,726.  Specification of Letters Patent.  Patented Sept. 14, 1920.

Application filed October 29, 1918. Serial No. 260,106.

*To all whom it may concern:*

Be it known that I, NORMAN JOHN DAYSH, a subject of the King of Great Britain, residing at Poughkeepsie, county of Dutchess, and State of New York, have invented a new and useful Improvement in Milking Machinery, of which the following is a full, clear, and exact description, reference being had to the accompanying drawings, which form a part of this specification.

It is known, in the art of milking machines of the pulsating type, that when pulsations are transmitted to the teat cups from a pulsator located at relatively long distance, the pulsations are comparatively weak. Again, where the teat cups are connected to the pulsation line at widely varying distances from the pulsator, the pulsations in the teat cups at the different locations are of such different strength that if they are properly regulated to give pulsations of the required strength to the teat cups when relatively near the pulsator, the pulsations tend to flatten out when the teat cups are located at a more remote distance.

These objections have been found to be particularly serious in that type of installation comprising a vacuum line, a pulsation line connected with a master or primary pulsator, sets of two-chamber teat cups whose inner chambers are connected with the milk pail and the vacuum line, and secondary pulsators, one (say) for each set of teat cups, connected with the pulsation line and operable by the pulsations therein to create pneumatic pulsations in the outer teat cup chambers. Examples of such a type of milking machine are comprised in the Leitch Patent, No. 1,196,000, dated August 29, 1916, and the Forsyth Patent, No. 1,257,688, dated February 26, 1918. In such a machine the master pulsator is located at a point where mechanical power is conveniently available, generally at the pump that produces the vacuum in the vacuum line, and at various points along the two mains, cocks are provided to permit working connections to be established between the mains and the branch pipes connected with the pail and teat cups. When these connections are made at a point more or less remote from the master pulsator, the master pulsations flatten out until they are too weak to operate the secondary pulsator. Without some means for overcoming this difficulty, the practical operativeness of milking machinery of the type above described would be limited to installations wherein conditions permit the location of the master pulsator comparatively close to the branch pipe connections and to installations of limited size; and notwithstanding its pronounced advantages over other types of milking machinery, it would be unworkable, or at least unsatisfactory, where conditions compel the location of the primary pulsator at a substantial distance from the branch pipe connections, or where long mains are required owing to the size of the installations.

So far as I know, the only feasible means of carrying the pulsations from the master pulsator through a long line and transmitting them to the secondary pulsator in substantially their full strength is that set forth in the patent granted to me August 20, 1918, No. 1,276,184, wherein a relay valve, controlled by the pulsations of the master pulsator, operates to produce secondary pulsations in that part of the pulsation pipe line comparatively distant from the primary pulsator. This system I have found absolutely efficient and I know of no installation of any size to which it cannot be successfully adapted.

In certain barns, however, I have found that although the total length of the pulsation pipe line may be too great to permit the use of an ordinary master pulsator without the use of one or more relays, it is possible, by locating the vacuum pump, vacuum tank, and master pulsator at a point intermediate the length of the pulsation pipe and by modifying the construction of the master pulsator, to dispense with the use of relay valves or to reduce the number which would otherwise be necessary.

In carrying out my invention, the pulsation pipe line is divided into a plurality of (normally two) separate and independent lines and the master pulsator, operated conveniently from the vacuum pump, acts to connect each pulsation pipe line alternately with atmosphere and vacuum. Preferably, the arrangement is such that while the master pulsator is admitting air into one pipe line it is allowing air from the other pipe line to exhaust into the vacuum tank.

Figure 2:
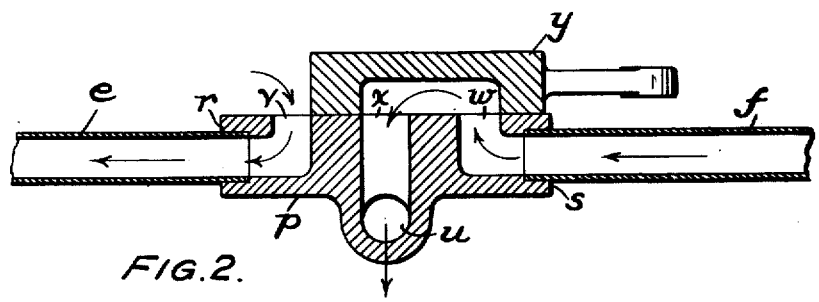
Figure 3:
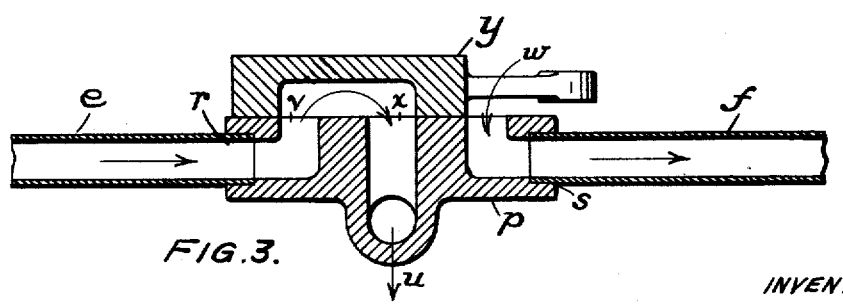
Figure 4:
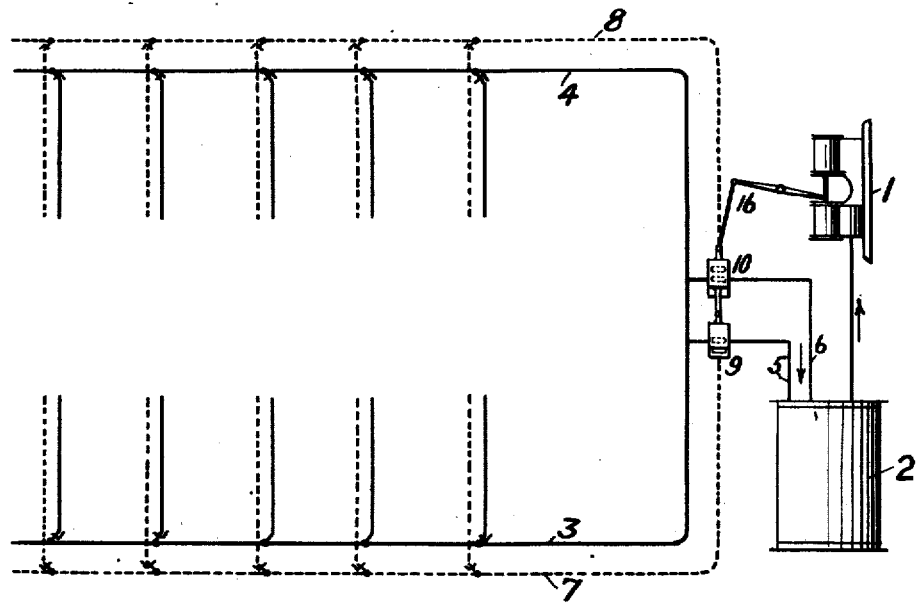
Figure 5:
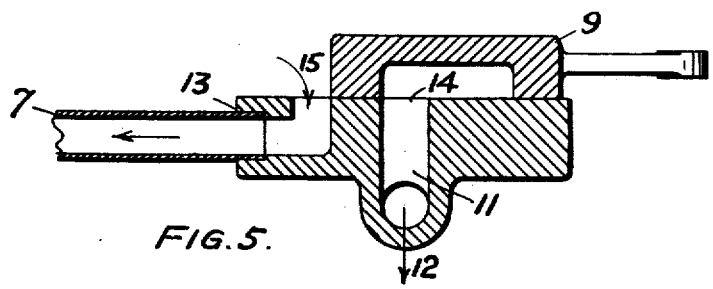
Figure 6:
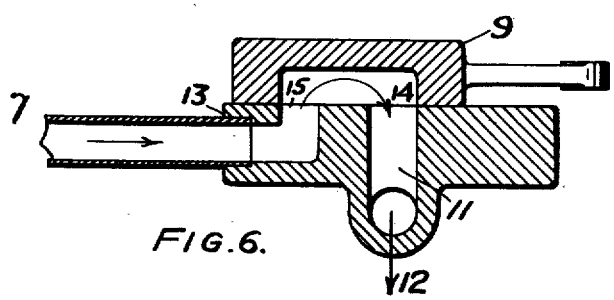

The drawings illustrate a typical arrangement, it being understood that the showing is largely diagrammatic. Figure 1 is a diagram of the entire system. Figs. 2 and 3 are detail views showing the master pulsator in its two opposite positions. Fig. 4 is a diagram of a modified system. Figs. 5 and 6 are detail views showing one of the two master pulsators of Fig. 4 in two opposite positions.

A vacuum pump $a$ and vacuum tank $b$ are connected to a vacuum line at some point along its length more or less distant from either end. Where conditions permit, I prefer to connect the vacuum line with the vacuum tank at a point midway of its length, forming two communicating branch lines $c$ and $d$ of equal length. From a point adjacent the junction of the vacuum lines $c$ and $d$, extend two pulsation lines $e$ and $f$. These two lines are preferably non-communicating. Along each of the several pipe lines are cocks $h$ adapted for connection to the branch pipes $i$ and $j$ of a milking machine unit.

Each milking machine unit comprises a milk pail $m$, a set of double chamber teat cups $n$, and a claw $o$; the latter affording communication between the inner teat cup chambers and the milk pail and containing a secondary pulsator which is adapted to connect the pulsation chambers of the teat cups alternately with atmosphere and vacuum. Typical milking machine units that can be utilized in the system are shown in the Forsyth patent and Leitch patent hereinbefore mentioned.

Connecting the two pipes $e$ and $f$ is a valve chamber $p$, which is provided with end ports $r$ and $s$ communicating with the pulsation lines $e$ and $f$ respectively, a port $u$ communicating with the pipe $t$ leading from the vacuum branches $c$ and $d$ to the vacuum tank, and three ports $v$, $w$ and $x$. The master pulsator valve $y$ is adapted, in its reciprocation, first to connect the pulsation pipe $e$ with atmosphere and the pulsation pipe $f$ with vacuum, as shown in Fig. 2, and then to connect the pulsation pipe $f$ with atmosphere and the pulsation pipe $e$ with vacuum, as shown in Fig. 3.

Any suitable connections $z$ may be employed to actuate the valve $y$ from the vacuum pump $a$.

Thus, by the use of but one master pulsator, pneumatic pulsations may be produced throughout the entire system while the pulsations are carried through only half the length of the entire pulsation line, thereby avoiding the necessity of using relay valves or reducing the number of relay valves required.

Another less desirable, but practicable, means of effecting the same result is disclosed in Figs. 4, 5 and 6. As in the preferred embodiment of my invention, the vacuum pump 1 and vacuum tank 2 are connected to a vacuum line between its ends, forming two lines 3 and 4. Each line may have a separate connection with the vacuum tank, 5 and 6 representing these connections. Two pulsation pipe lines 7 and 8 are provided, one extending along the vacuum line 3 and the other extending along the vacuum line 4. The master pulsator comprises two valves, one valve being placed in operative relation with each pulsation line and with the corresponding vacuum line. 9 and 10 represent the two valves of the master pulsator. In Figs. 5 and 6 is shown one of the pulsator valves (9) in operative relation with a valve chamber 11. The valve chamber is provided with a vacuum port 12 connected with the vacuum pipe 5, a port 13 connected with the pulsation pipe line 7, and ports 14 and 15 connected respectively with the ports 12 and 13. The pulsator valve 9, in its reciprocations, connects port 15 alternately with port 12 and the atmosphere, thereby transmitting pneumatic pulsations to the pulsation line 7. Both pulsation valves are operated, through suitable connections 16, from the vacuum pump 1. The two valves of the master pulsator are preferably so arranged that while one valve connects one pulsation line with atmosphere, the other valve connects the other pulsation line with vacuum. Thus the exhaust of air into the vacuum tank is constant and regular, as in the preferred embodiment of my invention; whereas, in the ordinary master pulsation system, while the exhaust through the vacuum is constant, the exhaust through the pulsation line is intermittent. Figs. 5 and 6 may therefore be regarded as showing not only the two positions of a single master pulsator valve but also the positions which the two valves of the master pulsator simultaneously occupy.

In the claims I employ the terms "pressure" and "vacuum" in a relative and not in an absolute sense, the two terms being intended to comprehend any two substantially different degrees of absolute pressure, such as the pressure of the atmosphere and the partial vacuum produced by a vacuum pump, as in the specific embodiment described.

Having now fully described my invention, what I claim and desire to protect by Letters Patent is:

1. In a milking machine operating system, in combination, a milking machine unit comprising teat cups and a branch pulsation pipe, a plurality of independent pulsation pipe lines adapted for connection, at different points along their length, with such milking machine unit, a source of power, and pulsation means, independent of either pulsation line connected with and operable, independently of its own pulsations, from said source of power to transmit pneumatic pulsations through the several pulsation lines.

2. In a milking machine operating system, in combination, a portable milking machine unit comprising teat cups, a pulsation branch pipe and a vacuum branch pipe; a vacuum line, a plurality of pulsation pipe lines extending along different parts of the vacuum line, cocks arranged on the vacuum line and each adapted for connection with the vacuum pipe of said unit, cocks arranged on the pulsation pipe lines and each adapted for connection with the pulsation pipe of said unit, and a master pulsator from which said pulsation pipe lines diverge and which supplies pneumatic pulsations to said pulsation pipe lines.

3. In a milking machine operating system, in combination, a plurality of pulsation pipe lines adapted for connection at different points along their length with a milking machine unit, a source of vacuum, and means comprising a master pulsator operable independently of the pulsations produced thereby and adapted to simultaneously connect one pipe line with vacuum and another with pressure and alternately therewith to connect the first pipe line with pressure and the second with vacuum.

4. In a milking machine operating system, the combination with a vacuum pump and a vacuum pipe line, of a milking machine unit comprising teat cups, a pulsation branch pipe and a vacuum branch pipe; a plurality of independent pulsation pipe lines, said milking machine unit adapted for connection with the vacuum line and with either pulsation line at different points along said lines, and means connected with and operable by the vacuum pump, independently of the vacuum pipe line and of the pulsations in any pulsation line, to connect each pulsation line alternately with pressure and vacuum.

5. In a milking machine operating system, in combination, a source of vacuum, a vacuum pipe line connected therewith, a plurality of pulsation pipe lines extending along different parts of the vacuum line, and means comprising a master pulsator operable independently of the pulsations produced thereby and adapted to connect each pulsation line alternately with pressure and the vacuum line.

6. In a milking machine operating system, in combination, a vacuum pump, a vacuum pipe line connected therewith, a plurality of pulsation pipe lines extending along different parts of the vacuum line, a master pulsator adapted to simultaneously connect one pulsation line with vacuum and another with pressure and then simultaneously reverse the connections, and means for operating the master pulsator from the vacuum pump.

7. In a milking machine operating system, in combination, a plurality of pulsation pipe lines, a milking machine unit comprising teat cups and a secondary pulsator adapted for connection to any pulsation line, and a master pulsator adapted to transmit pneumatic pulsations through the several pipe lines directly to a secondary pulsator connected with any of such pipe lines.

8. In a milking machine operating system, in combination, a plurality of pulsation pipe lines, a milking machine unit comprising teat cups and a secondary pulsator adapted for connection to any pulsation line, a source of vacuum, and a master pulsator adapted to simultaneously connect one pulsation line with pressure and another with vacuum and alternately therewith to connect the first pulsation line with vacuum and the second with pressure.

9. In a milking machine operating system, in combination, a source of vacuum, a vacuum pipe line connected therewith, a plurality of pulsation pipe lines extending along different parts of the vacuum line, a milking machine unit comprising teat cups and a secondary pulsator, said unit adapted for connection with the vacuum line and any pulsation line, and means comprising a master pulsator operable independently of the pulsations produced thereby and adapted to connect each pulsation line alternately with pressure and vacuum.

10. In a milking machine operating system, in combination, a vacuum pump, a vacuum pipe line connected therewith, a plurality of pulsation pipe lines extending along different parts of the vacuum line, a milking machine unit comprising teat cups and a secondary pulsator, said unit adapted for connection with the vacuum line and any pulsation line, a master pulsator adapted to simultaneously connect one pulsation line with vacuum and another with pressure and then simultaneously reverse the connections, and means for operating the master pulsator valve from the vacuum pump.

11. In a milking machine operating system, the combination with a vacuum pipe line and a vacuum pump connected therewith; of a plurality of independent pulsation pipe lines extending along different parts of the vacuum line, a milking machine unit adapted for connection with the vacuum line and either pulsation line; said unit comprising double chamber teat cups, means to connect the inner teat cup chambers with the vacuum line, and a secondary pulsator connected with and controllable by the pulsation line with which it may be connected to transmit pneumatic pulsations to the outer teat cup chambers; and a master pulsator connected with and operable independently of its own pulsations by the vacuum pump to connect each of the several pulsation lines alternately with vacuum and pressure.

12. In a milking machine operating system, the combination with a vacuum pipe line and a vacuum pump connected therewith; of a plurality of independent pulsation pipe lines extending along different parts of the vacuum line, a milking machine unit adapted for connection with the vacuum line and either pulsation line; said unit comprising double chamber teat cups, means to connect the inner teat cup chambers with the vacuum line, and a secondary pulsator connected with and controllable by the pulsation line with which it may be connected to transmit pneumatic pulsations to the outer teat cup chambers; and means comprising a master pulsator operable independently of the pulsations produced thereby and adapted to transmit pneumatic pulsations through the several pulsation lines.

13. In a milking machine operating system, in combination, a vacuum pump, two pulsation pipe lines, a valve chamber provided with ports connected respectively to the vacuum pump, to a source of pressure fluid and to the pulsation lines, a master pulsator adapted to alternately connect each pulsation line port alternately with a pressure port and a vacuum port and to connect each pulsation line port with pressure while the other is connected with vacuum, and mechanical means to reciprocate the master pulsator from the vacuum pump.

14. In a milking machine operating system, in combination, a portable milking machine unit comprising teat cups and a pulsation branch pipe connected with said unit and adapted to convey pneumatic pulsations thereto; a plurality of pulsation pipe lines, cocks arranged on the pulsation pipe lines, said branch pipe being connectible with any of said cocks, and means comprising a master pulsator operable independently of the pulsations produced thereby and adapted to connect each pulsation line alternately with pressure and vacuum.

15. In a milking machine operating system, in combination, a portable milking machine unit comprising teat cups, a pulsation branch pipe and a vacuum branch pipe; a vacuum line, a plurality of pulsation pipe lines extending along different parts of the vacuum line, cocks arranged on the vacuum line and each adapted for connection with the vacuum pipe of said unit, cocks arranged on the pulsation pipe lines and each adapted for connection with the pulsation pipe of said unit, and means comprising a master pulsator operable independently of the pulsations produced thereby and adapted to connect each pulsation line alternately with pressure and vacuum.

In testimony of which invention, I have hereunto set my hand, at New York, on this 25th day of October, 1918.

NORMAN JOHN DAYSH.

Witnesses:
GEORGE R. REMINGTON,
GEORGE D. TALLMAN.